US005463965A

United States Patent [19]
Cordrey

[11] Patent Number: 5,463,965
[45] Date of Patent: Nov. 7, 1995

[54] PAPERBOARD SUPPORT STRUCTURE FOR SUPPORTING A LOAD

[75] Inventor: Daniel Cordrey, Bedford, Tex.

[73] Assignee: Lin Pac Inc., Atlanta, Ga.

[21] Appl. No.: 190,481

[22] Filed: Feb. 2, 1994

[51] Int. Cl.⁶ ..................................... B65D 19/06
[52] U.S. Cl. .................. 108/513; 108/51.1; 297/440.12
[58] Field of Search .................................. 108/51.3, 51.1, 108/165, 180; 229/939; 297/440.12

[56] References Cited

U.S. PATENT DOCUMENTS

| | | | |
|---|---|---|---|
| 2,388,730 | 11/1945 | Fallert | 108/51.3 |
| 2,432,295 | 12/1947 | Donahue | 108/51.3 |
| 2,446,914 | 8/1948 | Fallert et al. | 108/51.3 |
| 2,493,562 | 1/1950 | Yarman | 108/51.3 |
| 2,501,506 | 3/1950 | George | 108/51.3 |
| 2,506,346 | 5/1950 | Crawford | 108/51.3 |
| 2,576,715 | 11/1951 | Farrell | 108/51.3 |
| 2,583,443 | 1/1952 | Perry et al. | 108/51.3 |
| 2,728,545 | 12/1955 | Hermitage | |
| 2,856,826 | 10/1958 | Norquist et al. | |
| 2,940,513 | 6/1960 | Holden | 297/440.12 |
| 2,957,668 | 10/1960 | Norquist et al. | 108/51.3 |
| 3,092,046 | 6/1963 | Davidson | 108/51.3 |
| 3,199,764 | 8/1965 | Oliver et al. | 108/51.3 |
| 3,212,464 | 10/1965 | Steuer | 297/440.12 |
| 3,312,503 | 4/1967 | Suzuki | 297/440.12 |
| 3,331,634 | 7/1967 | Harrison, Jr. | 297/440.12 |
| 3,460,790 | 8/1969 | Baird | 297/440.12 |
| 3,502,237 | 3/1970 | Verhein et al. | |
| 3,566,808 | 2/1971 | Notko et al. | 297/440.12 |
| 3,592,143 | 7/1971 | Krone | 297/440.12 |
| 3,661,099 | 5/1972 | Shelor | 108/51.1 |
| 3,722,430 | 3/1973 | Woodley et al. | 108/58 |
| 3,729,244 | 4/1973 | Butler | 297/440.12 |
| 3,776,145 | 12/1973 | Anderson et al. | 108/51 |
| 3,837,719 | 9/1974 | Barron | 297/440.12 |
| 4,042,127 | 8/1977 | Brossia | 108/51.3 X |
| 4,085,847 | 4/1978 | Jacalone | 108/51.3 |
| 4,391,202 | 7/1983 | Carter et al. | |
| 4,445,614 | 5/1984 | Mitsumori et al. | |
| 4,488,496 | 12/1984 | Polacco | 108/51.3 |
| 4,714,026 | 12/1987 | Yamaguchi et al. | |
| 4,867,074 | 9/1989 | Quesnick | 108/51.3 |
| 5,001,991 | 3/1991 | Smith | 108/51.3 |
| 5,129,329 | 7/1992 | Clasen | 108/51.3 |
| 5,218,913 | 6/1993 | Winebarger et al. | 108/51.3 |
| 5,327,839 | 7/1994 | Herring et al. | 108/51.3 |

FOREIGN PATENT DOCUMENTS

| | | |
|---|---|---|
| 1081630 | 7/1980 | Canada . |
| 1186695 | 4/1970 | United Kingdom . |

OTHER PUBLICATIONS

North American Container Corp. Advertisement for "Fibre/Core™".

Primary Examiner—Jose V. Chen
Assistant Examiner—Rodney B. White
Attorney, Agent, or Firm—Finnegan, Henderson, Farabow, Garrett & Dunner

[57] ABSTRACT

A support structure for supporting a load comprises a core of connected paper strips including spacer strips of corrugated paperboard and at least one bent strip having a plurality of laminated paper layers. The bent strip is disposed between opposing spacer strips and secured at bend surfaces along the bent strip. The bent strip and the opposing spacer strips have edge surfaces for supporting the load. The edge surfaces define a plane substantially perpendicular to the bend surfaces. The bent strip is preferably corrugated paperboard or chipboard. The opposing spacer strips may be substantially parallel, curved, or any combination of the two to provide a variety of desired shapes. The bent strip may be creased at substantially equal intervals to form bend surfaces along opposite sides of the bent strip. An adhesive is applied along the bend surfaces for securing the bent strip to opposing spacer strips and for holding the bent strip at a predetermined pitch angle. A cover may be wrapped around a substantial portion of the core for further reinforcing and restricting movement of the strips. The cover is preferably adhesively secured to the core.

40 Claims, 7 Drawing Sheets

PAPERBOARD SUPPORT STRUCTURE FOR SUPPORTING A LOAD

BACKGROUND OF THE INVENTION

The present invention relates to a structure for supporting a load and, more particularly, to a durable skid of recyclable paperboard.

Wood, metal, plastic, and paper are frequently manufactured into load supporting devices. One of the least expensive and most easily manipulated materials is paper. Various structures, such as corrugated paperboard, take advantage of the strength of paper by properly forming items to exploit paper's inherent characteristics. Specifically, a strip of corrugated paperboard is readily bent traversely of its plane, however, the strip has considerable tensile and compressive strength when subjected to edgewise pressure.

A supporting structure, such as a shelf, can be made from paper. Typically, the paper or corrugated paperboard is cut to lay across a plurality of brackets. However, multiple layers of the paper or corrugated paperboard must be built-up to provide the desired strength. Unfortunately, this built up mass adds weight, size and cost to the end product and places the load traverse to the plane of the shelf.

Another approach is to take advantage of the tensile and compressive strength of paper or corrugated paperboard under edgewise pressure. However, while strength is considerably increased, in a support structure resulting from a solid block of paper or from multiple layers of corrugated paperboard secured together with their respective edges turned toward the direction of the load, the weight and cost of the product is unacceptable. For example, multiple layers of triple-wall paperboard comprising three corrugated or fluted layers of paper placed between and secured to four planar paperboard layers can be secured together and used to exploit the edgewise strength of the paperboard. See, for example, U.S. Pat. No. 3,199,764. However, the same high density, weight, and cost drawbacks exist.

Various support structures for supporting a load have taken advantage of the relative low cost and pliable nature of paper. However, a less dense, higher strength, and more rigid structure for supporting a load is needed while maintaining low cost and light weight.

For example, pallets and skids of corrugated paperboard have gained considerable popularity within the industry for use in transporting various goods. In comparison to wooden pallets, corrugated paperboard, pallets and skids are lighter to transport and less expensive to make. Additionally, paperboard skids can be shredded for disposal, recycled to reduce refuse costs, and nonreturnable to eliminate return transportation costs. Corrugated paperboard skids are even lighter and less expensive than paperboard pallets. Since the skids do not have bottom slats they occupy less space in storage and shipping due to the advantage offered by alternate stacking.

U.S. Pat. No. 4,936,229 discloses a pallet having two flat sheets of cardboard separated by a plurality of individual layers of cardboard runners, which are adhesively connected to the sheets. In this design, strength and rigidity are given up in exchange for simplicity and cost savings.

A more intricate design is disclosed in U.S. Pat. No. 4,979,446. The '446 patent uses sheets of corrugated paperboard with holes, scores, and creases to make each stringer. The sheets are intricately folded to make a stringer having a vertically oriented core surrounded by alternating vertical and horizontal panels, thereby encasing most of the otherwise exposed corrugated fluting. The stringers interconnect to form a pallet. While the latter design is stronger and more rigid than the former, the resulting pallet is more complicated and costly.

In light of the foregoing, there is a need for a support structure which has the desired strength and rigidity to support a load, yet is relatively light and inexpensive. In particular, there is a need for a corrugated skid which has the necessary strength and rigidity to transport bulk goods, yet is relatively simple in design and correspondingly less costly to manufacture and having less weight to transport.

SUMMARY OF THE INVENTION

Accordingly, the present invention is directed to a support structure that overcomes the limitations and disadvantages of the related art.

Additional features and advantages of the invention will be set forth in the description which follows, and in part will be apparent from the description, or may learned by practice of the invention. The objective and other advantages of the invention will be realized and attained by the support structure for supporting a load particularly pointed out in the written description and claims hereof as well as the appended drawings.

To achieve these and other advantages in accordance with the purpose of the invention, as embodied and broadly described, the invention comprises a core of connected paper strips including spacer strips of corrugated paperboard and at least one bent strip having a plurality of laminated paper layers. The bent strip is disposed between opposing spacer strips and secured at bend surfaces along the bent strip. The bent strip and the opposing spacer strips have edge surfaces for supporting the load. The edge surfaces define a plane substantially perpendicular to the bend surfaces. The bent strip is preferably made of corrugated paperboard or chipboard and creased at substantially equal intervals to form the bend surfaces along opposite sides of the bent strip. The opposing spacer strips are preferably parallel. An adhesive is applied along the bend surfaces for securing the bent strip to the opposing spacer strips and for holding the bent strip at a predetermined pitch angle. The pitch angle between the bent surfaces is preferably between about 30 and 150 degrees.

The invention may also include a cover wrapped substantially around the core for further reinforcing and restricting movement of the strips. Preferably, the cover is adhesively secured to the core and may include a plurality of paperboard sheets or liner board.

Further, the invention may be formed into a plurality of individual cores of connected paper strips, each of the cores including spacer strips of corrugated paperboard and at least one bent strip having a plurality of laminated paper layers. The bent strip is disposed between opposing spacer strips and secured at bend surfaces along the bent strip. The bent strip and the opposing spacer strips have edge surfaces for supporting the load. The edge surfaces define a plane substantially perpendicular to the bend surfaces. At least two of the cores are aligned substantially in parallel and at least one of the cores interconnect the parallel cores to provide a support surface therebetween. A cover individually wraps around a substantial portion of the interconnecting cores for restricting movement of the strips within each of the covers, whereby each of the interconnecting cores and a corresponding cover defines a core and cover combination. The interconnecting core and cover combination is preferably substantially perpendicular to the parallel cores.

It is to be understood that both the foregoing general description and the following detailed description are exemplary and explanatory only, and are not restrictive of the invention, as claimed.

BRIEF DESCRIPTION OF THE DRAWINGS

The accompanying drawings are included to provide a further understanding of the invention and are incorporated in and constitute a part of this specification. The drawings illustrate several embodiments of the invention and together with the description, serve to explain the principles of the invention. In the drawings.

DESCRIPTION OF THE PREFERRED EMBODIMENTS

Figure 1A:
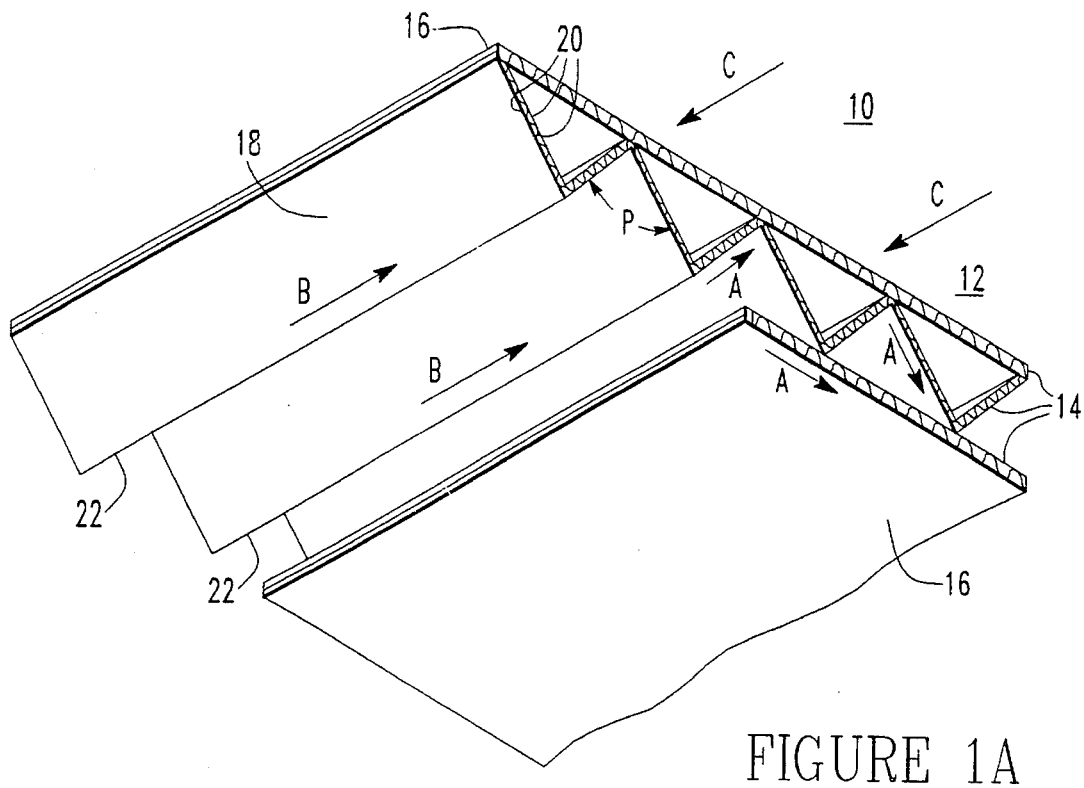
FIGS. 1A–1D are perspective views, partially cut-away, of support structures according to the present invention.
Figure 1B:
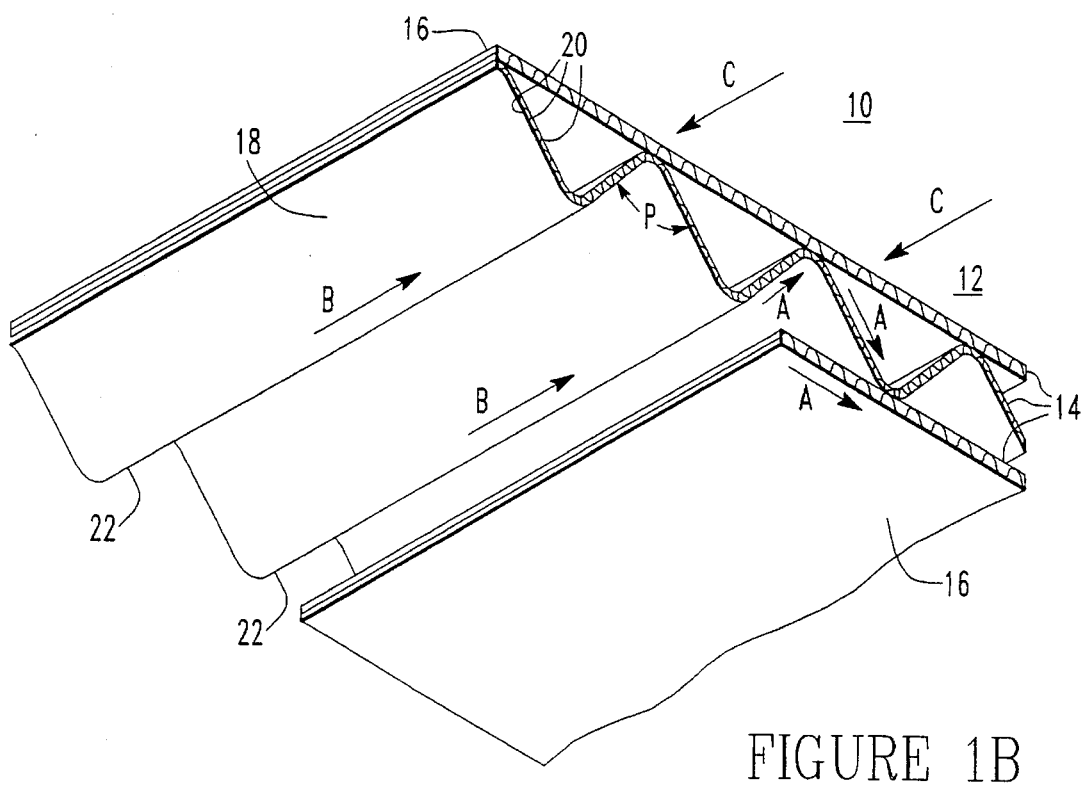
Figure 1C:
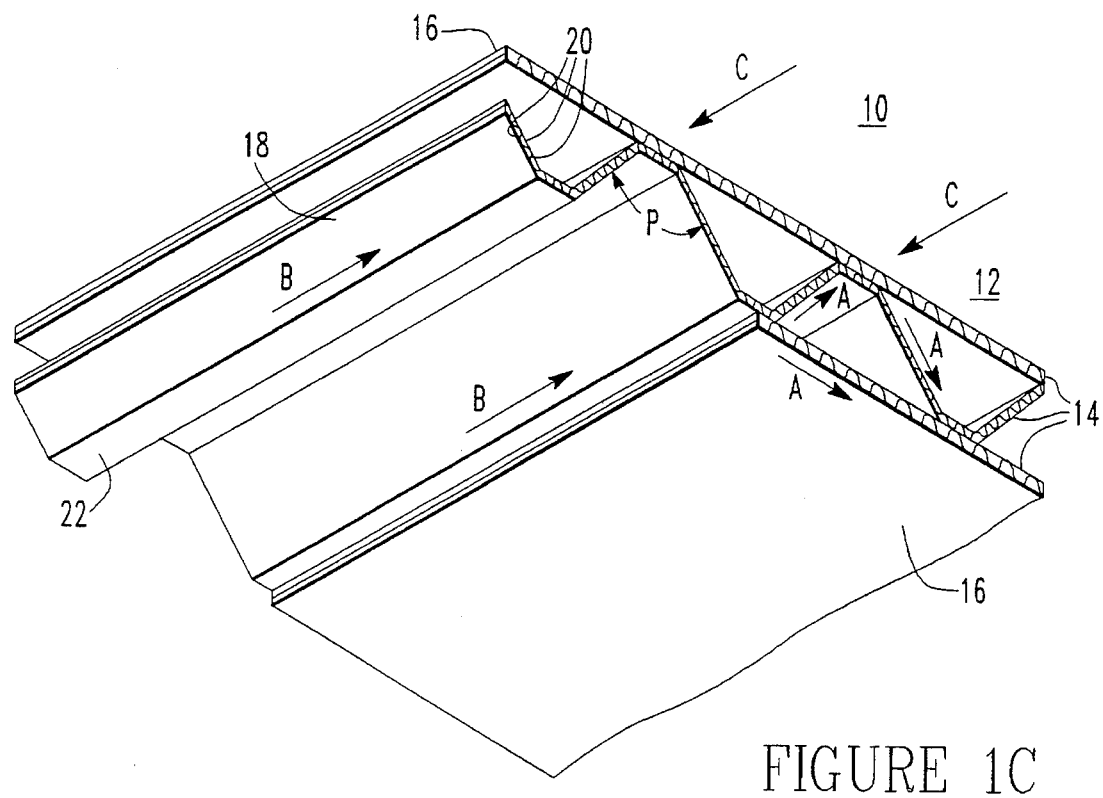

Reference will now be made in detail to the present preferred embodiments of the invention, examples of which are illustrated in the accompanying drawings. The exemplary embodiment of a support structure in accordance with the present invention is shown in FIGS. 1A–1D and is designated generally by the reference numeral 10.

Figure 2A:
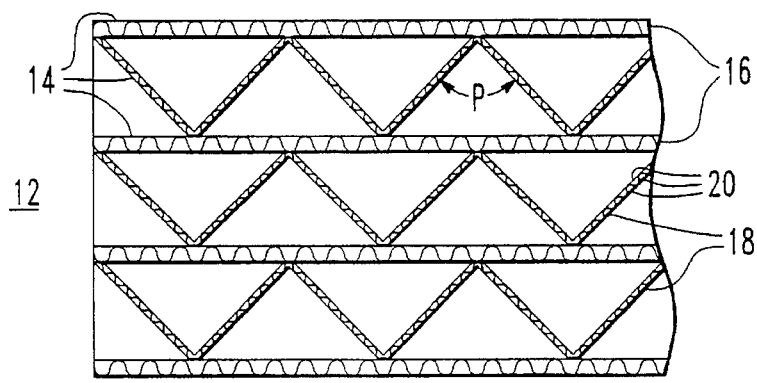
FIG 2A–2C are a top views of built-up support structures according to the present invention.
Figure 2B:
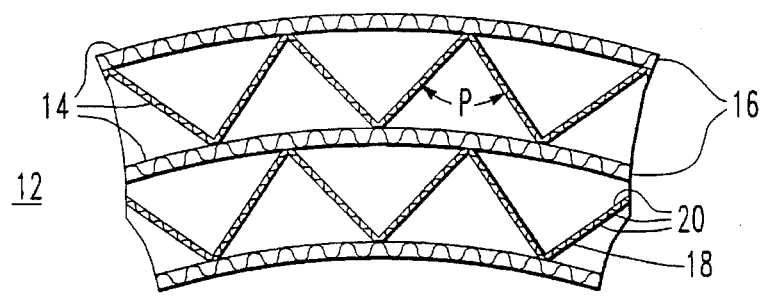
Figure 2C:
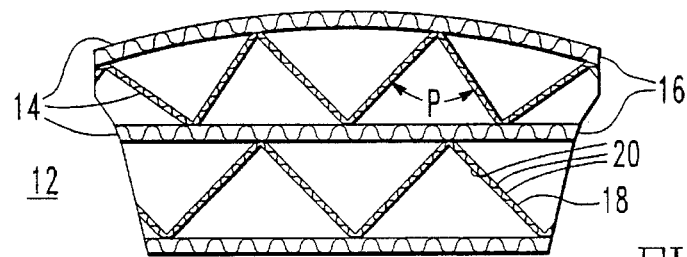

As embodied herein and as shown in FIG. 1A, the support structure 10 for supporting a load includes a core 12 of connected strips 14 including spacer strips 16 of corrugated paperboard and at least one bent strip 18 having a plurality of laminated paper layers 20. The bent strip 18 is disposed between opposing spacer strips 16 and secured at bend surfaces 22 along the bent strip 18. The bent strip 18 and the opposing spacer strips 16 have edge surfaces designated generally by arrows A. The edge surfaces define a plane substantially perpendicular to the bend surfaces 22 as further designated along arrow B. The direction of the compressive load for which the support structure 10 is particularly well adapted is indicated by arrows C. The spacer strips 16 are preferably substantially parallel. However, the spacer strips 16 may be curved, parallel, or a combination of the two as shown in FIGS. 2A–2C. While the preferred spacer strips 16 are substantially parallel, it is contemplated as well within the scope of this invention that the spacer strips 16 may be configured into various shapes depending on the design requirements of the support structure 10.

The bent strip 18 is preferably formed of corrugated paperboard. However, many multiple layer paper laminates may provide the stiffness and spacing to meet the strength, rigidity and weight requirements of a particular design. Another preferred multiple paper laminate for the bent strip 18 is chip board. The bent strip 18 may be creased at substantially equal intervals to form the bent surfaces 22 along opposite sides of the bent strip 18. Preferably, an adhesive is applied along the bend surfaces 22 for securing the bent strip 18 to the opposing spacer strips 16 and for holding the bent strip 18 at a predetermined pitch angle P. In addition to separating the spacer strips 16 to provide a strong and light-weight support structure 10, the bent strips 18 strengthen and reinforce the spacer strips 16 traverse of their plane. The bent strip 18 may have bend surfaces 22 that are sharp creases, gradual curves, or substantially planar contact surfaces, as shown in FIGS. 1A–1D. Preferably, however, as shown in FIGS. 1A–3, portions of the bent strip 18 extending between bend surfaces 22 are substantially planar.

Figure 1D:
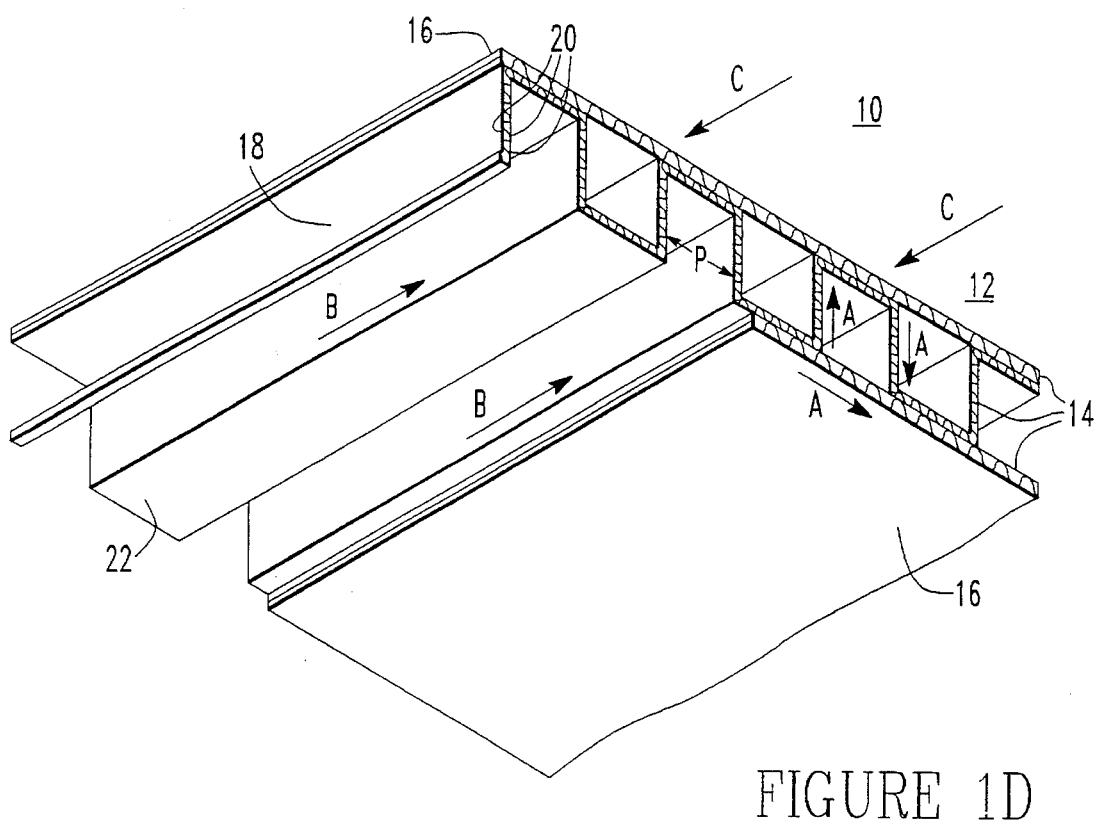

The pitch angle is preferably between about 30 and 150 degrees. A more preferred pitch angle P is about 110 degrees. However, as shown in FIG. 1D, the pitch angle P may be zero degrees if one desires a support structure 10 having portions of the bent strip 18 perpendicular to the plane of the opposing spacer strips 16. Moreover, the bend surfaces 22 and pitch angle P may be varied along the bent strip 18 for meeting different strength, rigidity, and weight requirements of a desired support structure 10.

Figure 3:
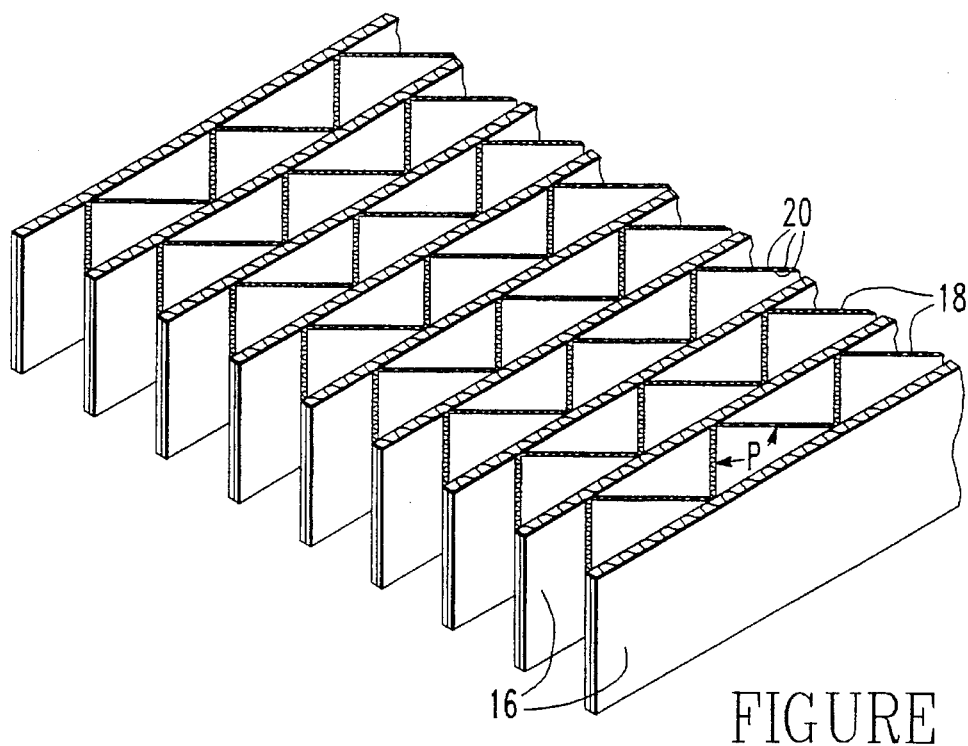
FIG. 3 is yet another embodiment of a support structure having multiple layers according to the present invention.
Figure 4:
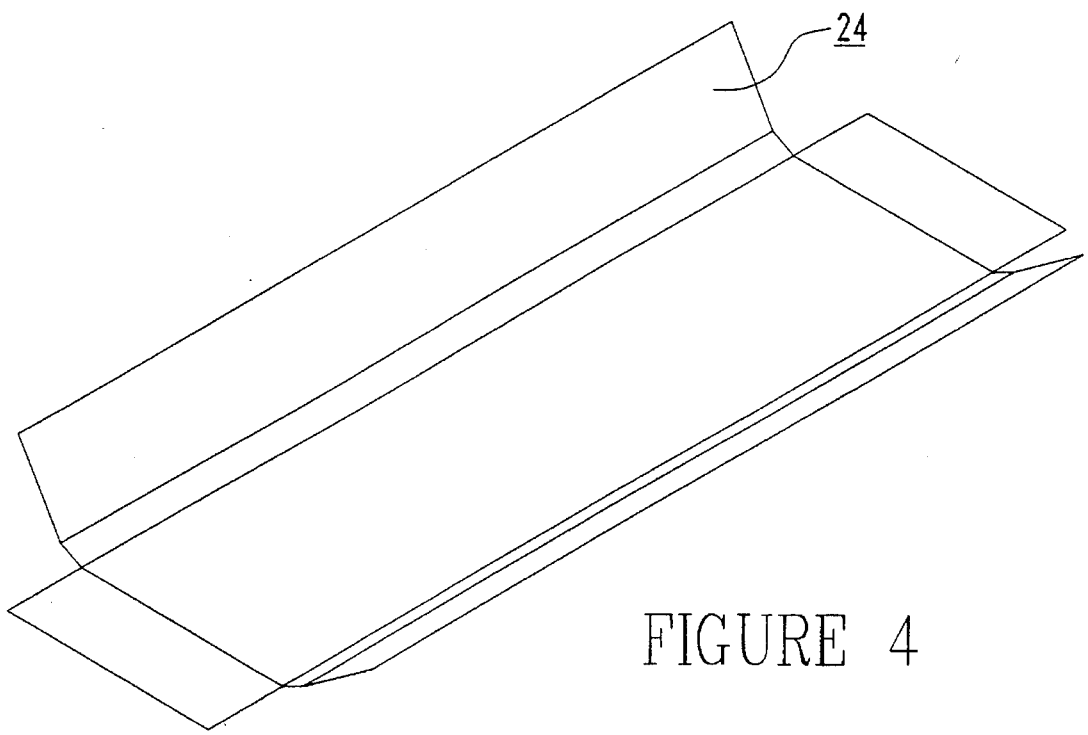
FIG. 4 is a perspective view of a cover for substantially wrapping around a multiple layer support structure according to the present invention.

FIG. 3 shows another embodiment of multiple layer support structure having a thin rectangular shape. This particular embodiment is similar to one typically used for shelves or planks. As shown in FIG. 4, a cover 24 may be wrapped substantially around the core 12 for further reinforcing and restricting movement of the strips. Preferably, the cover 24 is adhesively secured to the core 12. The cover 24 may include a plurality of paperboard sheets or have at least one sheet of linerboard. Alternatively, a light weight cover or veneer may be added for cosmetic reasons.

A preferred support structure 10 for supporting a load includes a plurality of individual cores 12 of connected paper strips 14. Each of the cores 12 includes spacer strips 16 of corrugated paperboard and at least one bent strip 18 having a plurality of laminated paper layers 20. At least one bent strip 18 is disposed between opposing spacer strips 16 and secured at bend surfaces 22 along the bent strip 18. At least two of the cores 12 are aligned substantially in parallel and at least one of the cores 12 interconnect the parallel cores 26 to provide a support surface therebetween. A cover 24 individually wrapped around a substantial portion of each of the interconnecting cores 28 provides for restricting movement of the strips 14 within each of the covers 24. The interconnecting core 28 and cover 24 combination is preferably substantially parallel to the parallel cores 26.

A preferred support structure 10 uses sixty-nine pound paperboard to make the corrugated paperboard of the spacer strips 16. A preferred bent strip 18 formed from corrugated paperboard may use sixty-nine pound paperboard as well. However, the preferred fluting of the spacer strips 16 is a b flute, while the preferred fluting of the bent strips 18 is an c flute. The opposed spacer strips 16 are preferably 0.7 inches apart. A twelve inch segment of a preferred support structure may include spacer strips 16 that are twelve inches long and a bent strip 18 that is approximately eighteen inches long when stretched flat.

Figure 5:
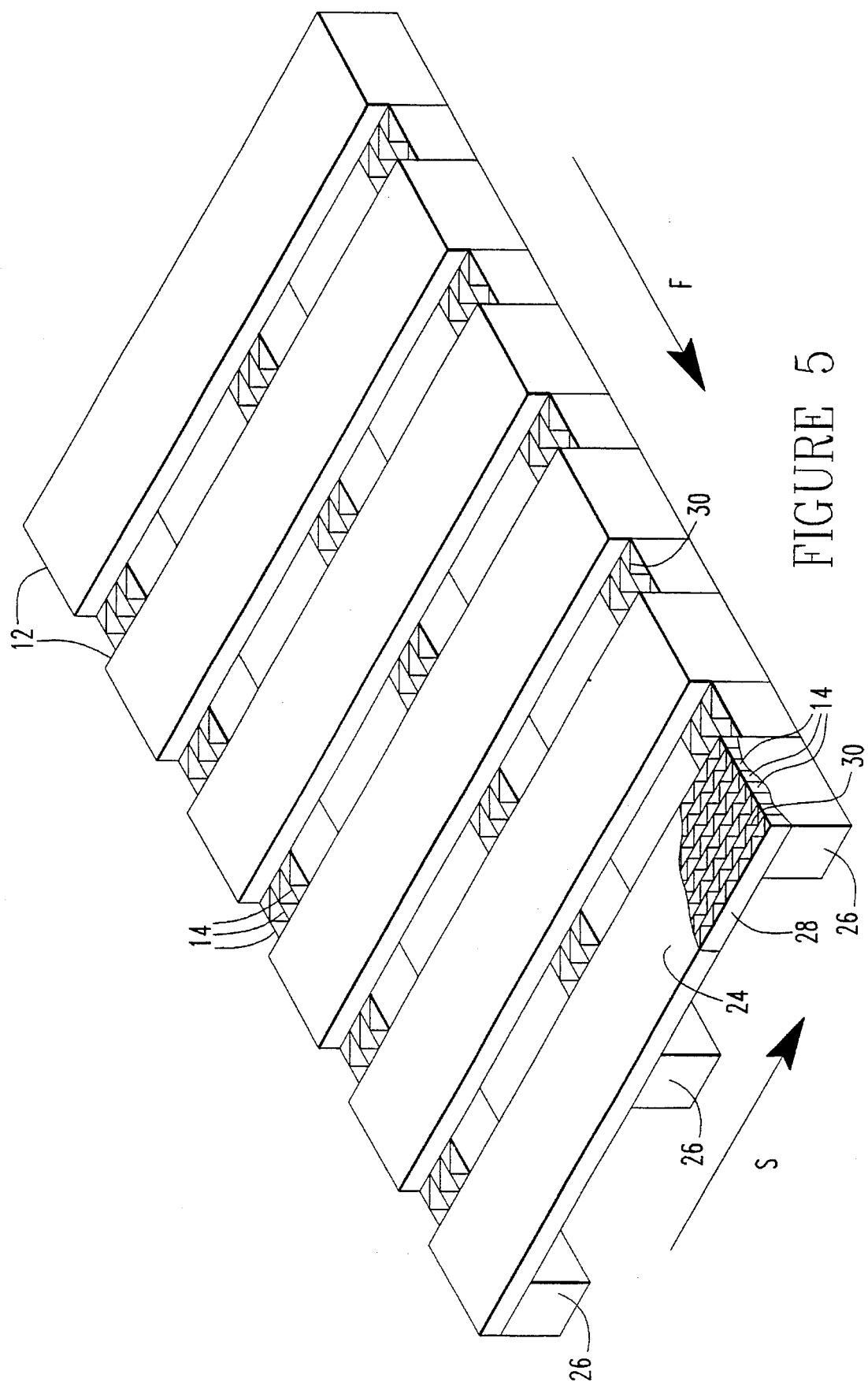
FIG. 5 is a perspective view, partially cut away, of a skid according to the present invention.
Figure 6:
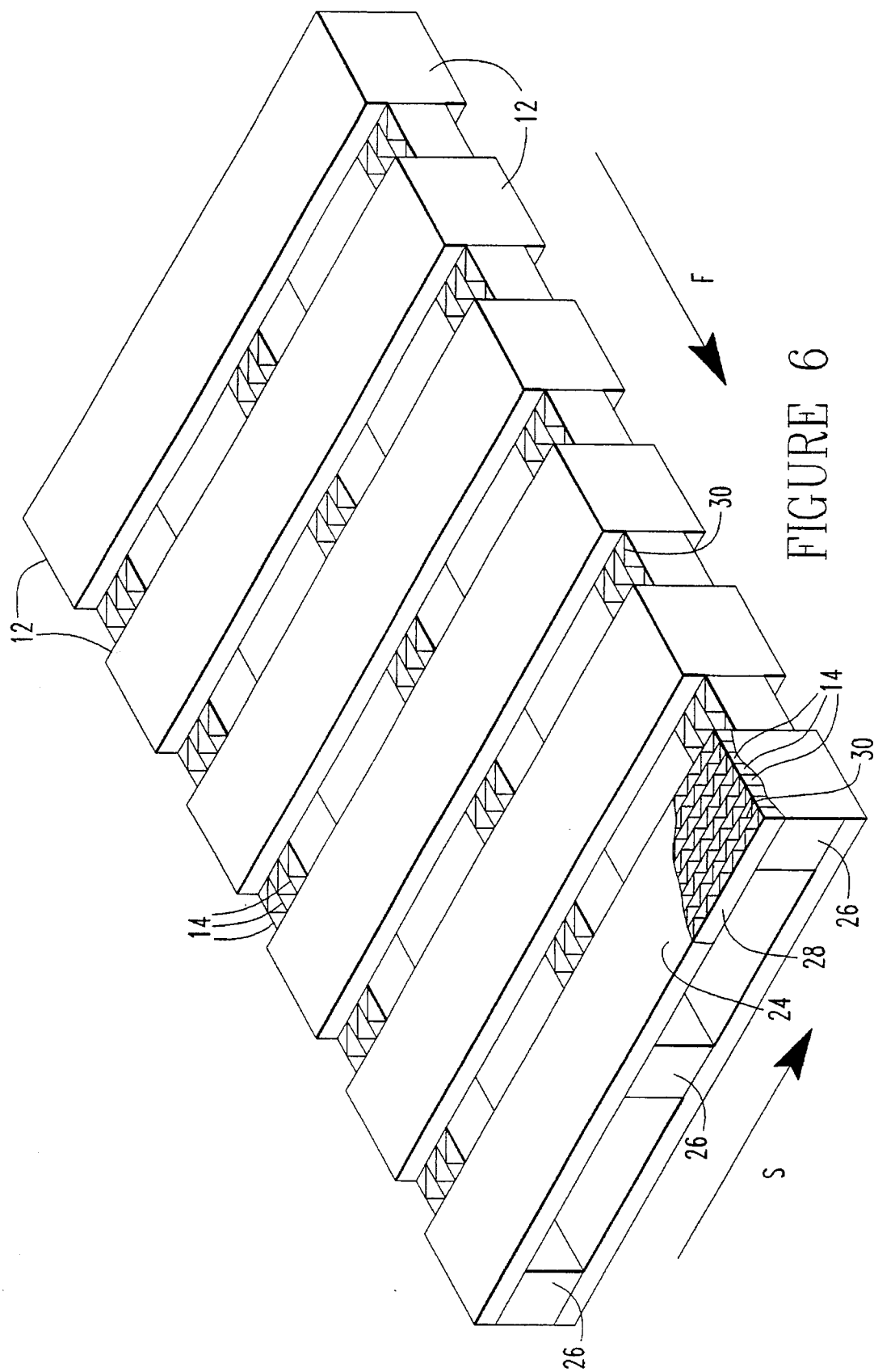
FIG. 6 is a perspective view, partially cut away, of a pallet according to the present invention.
Figure 7:
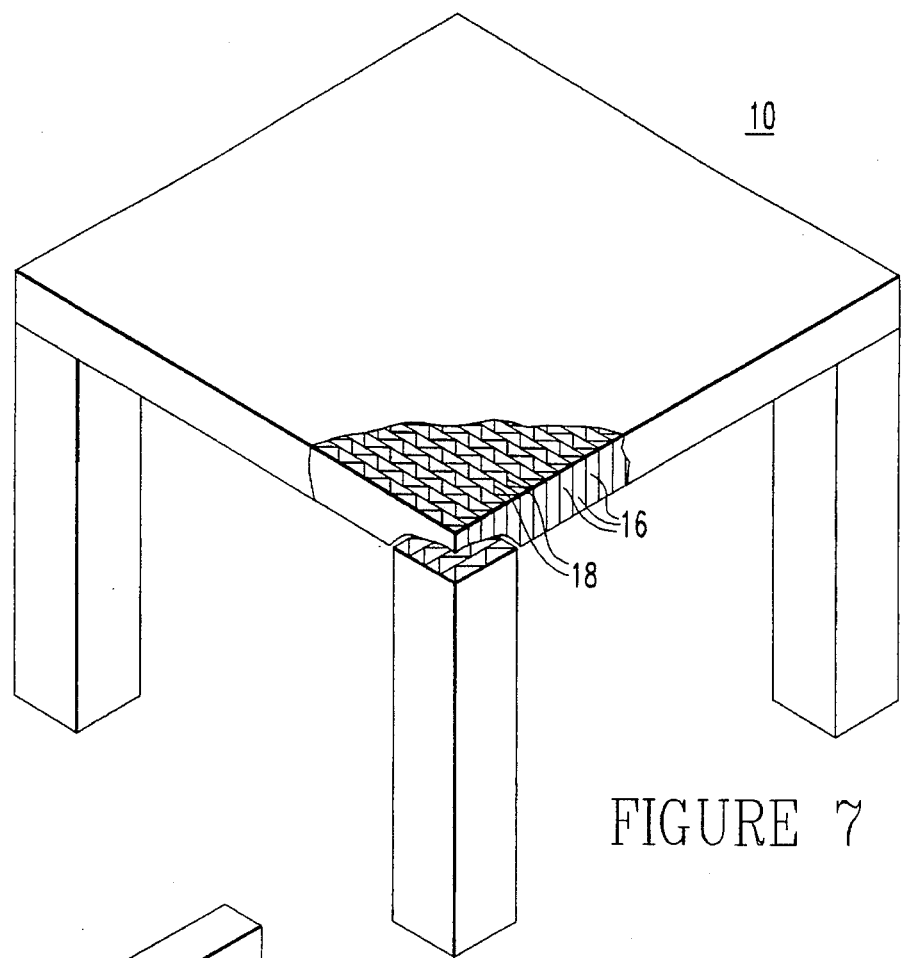
FIG. 7 is a perspective view, partially cut away, of a table according to the present invention.
Figure 8:
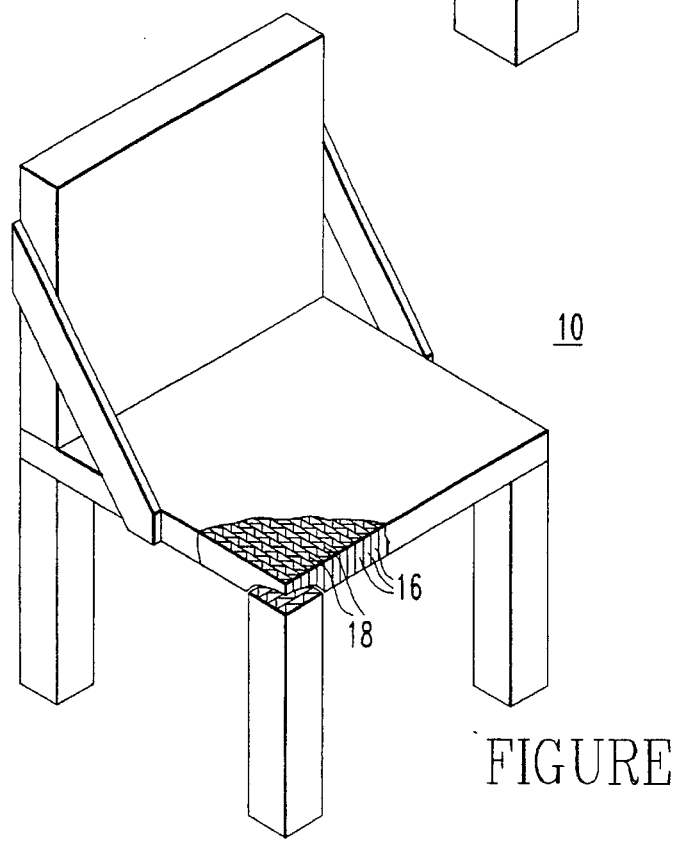
FIG. 8 is a perspective view, partially cut away, of a chair according to the present invention.

A preferred application of the support structure 10 for supporting a load is a skid, as illustrated in FIG. 5. A skid includes a plurality of individual cores 12 of connected paper strips 14 as defined in the previous paragraph. In the skid of FIG. 5, the corrugations 30 of the lower cores 26 define a first fluting direction F and corrugations 30 of the upper core 28 define a second fluting direction S. The first and second fluting directions F, S are substantially perpendicular.

In operation, an eighteen inch square section of the skid illustrated in FIG. 5 is capable of supporting more than four thousand two hundred pounds of weight. The two parallel cores 26 being tested were two and a half inches wide by four inches high. The parallel cores 26 included four spacer strips 16 having three bent strips 18 disposed between and secured to the spacer strips 16. The two interconnecting cores 28 were six and a half inches wide by one inch high. The interconnecting cores 28 included seven spacer strips 16 with six bent strips 18 disposed between and secured to the spacer strips 16.

The present invention has utility in a connection with a wide variety of support structures. For example, as illustrated in FIGS. 3, 6, 7 and 8, support structures embodying features of the present invention may include shelves, pallets, tables, and chairs, to name a few. The support structure may include a plurality of corrugated paperboard spacer strips having a continuous interior surface and an undulating strip of laminated paper layers secured between the plurality of corrugated paper strips. The spacer strips and the undulating strip have edge surfaces for supporting the load. The edge surfaces of spacer strips and the undulating strip constitute a support surface that is perpendicular to the interior surface.

The present invention enables the construction of a durable support structure that is made from strips of corrugated paperboard and a bent strip having a plurality of laminated paper layers. The strength and weight of the corrugated paperboard itself can be increased or decreased according to the needs of the user. The bent strip can have its number of laminated paper layers changed by modifying the type of corrugated board used or by modifying the thickness of the chip board accordingly. The number and thickness of cores and the choice of spacer strip and bent strip materials along with the cover can be varied. The present invention provides an easy and quick way to change a support structure in size, weight, strength, and rigidity to meet the requirements of the loads to be placed upon it by simply adding or removing layers from the cores adjusting the number of cores themselves and adjusting the cover sheets to be added.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed herein, but that the invention include all embodiments falling within the scope of the appended claims.

I claim:

1. A support structure for supporting a load comprising:
   a plurality of individual cores of connected paper strips, each of said cores including spacer strips of corrugated paperboard and bent strips of laminated paper, said bent strips being disposed between opposing spacer strips and secured to opposing spacer strips at bend surfaces spaced apart along each of said bent strips, wherein any two of said bent strips are secured to opposite sides of at least one of said spacer strips;
   said bent strips and said opposing spacer strips having edge surfaces for supporting the load, said edge surfaces defining a plane substantially perpendicular to said bend surfaces; and
   whereby two of said cores are interconnected by another one of said cores to provide a support surface therebetween.

2. The support structure as defined in claim 1, wherein said bent strips are formed of corrugated paperboard.

3. The support structure as defined in claim 1, wherein said bent strips are formed of chipboard.

4. The support structure as defined in claim 1, wherein said opposing spacer strips are curved.

5. The support structure as defined in claim 1, wherein said opposing spacer strips are substantially parallel and said bend surfaces define a substantially planar contact surface.

6. The support structure as defined in claim 5, wherein said bent strips are creased at substantially equal intervals to form said bend surfaces along opposite sides of said bent strips.

7. The support structure as defined in claims 1 or 5, also including an adhesive applied along said bend surfaces for securing said bent strips to said opposing spacer strips and for holding said bent strips at a predetermined pitch angle.

8. The support structure as defined in claim 7, wherein said pitch angle is between about 30 and about 150 degrees.

9. The support structure as defined in claim 7, wherein said pitch angle is about 110 degrees.

10. The support structure as defined in claim 7, wherein said pitch angle varies along said bent strips.

11. The support structure as defined in claim 1, further comprising a cover wrapped substantially around said core for further reinforcing and restricting movement of said strips.

12. The support structure as defined in claim 11, wherein said cover is adhesively secured to said core.

13. The support structure as defined in claim 11, wherein said cover includes a plurality of paperboard sheets.

14. The support structure as defined in claim 11, wherein said cover includes at least one sheet of liner board.

15. A support structure for supporting a load comprising:
   a plurality of individual cores of connected paper strips, each of said cores including spacer strips of corrugated paperboard and bent strips of laminated paper, said bent strips being disposed between opposing spacer strips and secured to opposing spacer strips at bend surfaces spaced apart along each of said bent strips, wherein any two of said bent strips are secured to opposite sides of at least one of said spacer strips;
   said bent strips and said opposing spacer strips having edge surfaces for supporting the load, said edge surfaces defining a plane substantially perpendicular to said bend surfaces;
   at least two of said cores being aligned substantially in parallel and at least one of said cores interconnecting said parallel cores to provide a support surface therebetween; and
   covers individually wrapped around a substantial portion of each of said cores for restricting movement of said strips within each of said covers, whereby each of said cores and a corresponding cover defines a core and cover combination.

16. The support structure as defined in claim 15, wherein said at least one interconnecting core and cover combination is substantially perpendicular to said parallel cores.

17. The support structure as defined in claim 15, wherein the support structure is a table.

18. The support structure as defined in claim 15, wherein the support structure is a shelf.

19. The support structure as defined in claim 15, wherein the support structure is a chair.

20. The support structure as defined in claim 15, wherein the support structure is a pallet.

21. The support structure as defined in claim 15, wherein the support structure is a skid.

22. A skid comprising:

a plurality of individual cores of connected paper strips, each of said cores including spacer strips of corrugated paperboard and bent strips of laminated paper, said bent strips being disposed between opposing spacer strips and secured to said opposing spacer strips at bend surfaces spaced apart along said bent strips, wherein any two of said bent strips are secured to opposite sides of at least one of said spacer strips;

said bent strips and said opposing spacer strips having edge surfaces for supporting the load, said edge surfaces defining a plane substantially perpendicular to said bend surfaces;

at least two of said cores being aligned substantially in parallel and at least one of said cores interconnecting said parallel cores to provide a support surface therebetween; and covers individually wrapped around a substantial portion of each of said interconnecting cores for restricting movement of said strips within each of said covers, whereby each of said cores and a corresponding cover defines a core and cover combination.

23. The skid as defined in claim 22, wherein corrugations of said parallel cores define a first fluting direction and corrugations of said at least one interconnecting core and cover combination define a second fluting direction, said first and second fluting directions being substantially perpendicular.

24. The support structure as defined in claim 22, wherein said bent strips are corrugated paperboard.

25. The support structure as defined in claim 22, wherein said bent strips are chipboard.

26. The support structure as defined in claim 22, wherein said opposing spacer strips are curved.

27. The support structure as defined in claim 22, wherein said opposing spacer strips are substantially parallel.

28. The support structure as defined in claim 27, wherein said bent strips are creased at substantially equal intervals to form said bend surfaces along opposite sides of said bent strips.

29. The support structure as defined in claims 22 or 27, also including an adhesive applied along said bend surfaces for securing said bent strips to said opposing spacer strips and for holding said bent strips at a predetermined pitch angle.

30. The support structure as defined in claim 29, wherein said pitch angle is between about 30 and about 150 degrees.

31. The support structure as defined in claim 29, wherein said pitch angle is about 110 degrees.

32. The support structure as defined in claim 29, wherein said pitch angle varies along said bent strip.

33. The support structure as defined in claim 22, furthering comprising a cover wrapped substantially around said core for further reinforcing and restricting movement of said strips.

34. The support structure as defined in claim 33, wherein said cover is adhesively secured to said core.

35. The support structure as defined in claim 33, wherein said cover includes a plurality of paperboard sheets.

36. The support structure as defined in claim 33, wherein said cover includes at least one sheet of liner board.

37. A support structure for supporting a load comprising:

a plurality of individual cores of connected paper strips, each of said cores including at least three substantially parallel spacer strips of corrugated paperboard and bent strips of laminated paper, at least one of said bent strips being interposed between each of said spacer strips, said bent strips being adhesively secured to said spacer strips at bend surfaces spaced apart along each of said bent strips, wherein selected ones of said bent strips are secured along opposite sides of at least one of said spacer strips;

said paper strips having edge surfaces for supporting the load, said edge surfaces defining a plane substantially perpendicular to said bend surfaces; and whereby two of said cores are interconnected by another one of said cores to provide a support surface therebetween.

38. The support structure as defined in claim 37, also including means enveloping a portion of said core for restricting movement of said paper strips.

39. The support structure as defined in claim 37, wherein portions of said bent strips extending between said bend surfaces are substantially planar.

40. The support structure as defined in claim 37, wherein said laminated paper is corrugated paperboard.

* * * * *